(12) United States Patent
Brouaux

(10) Patent No.: US 7,818,687 B2
(45) Date of Patent: Oct. 19, 2010

(54) DYNAMIC GRAPHIC USER INTERFACE

(75) Inventor: Alexandre Marc Jacques Brouaux, Montigny le Bretonneux (FR)

(73) Assignee: RealNetworks, Inc., Seattle, WA (US)

( * ) Notice: Subject to any disclaimer, the term of this patent is extended or adjusted under 35 U.S.C. 154(b) by 625 days.

(21) Appl. No.: 11/039,070

(22) Filed: Jan. 19, 2005

(65) Prior Publication Data

US 2005/0270307 A1    Dec. 8, 2005

(51) Int. Cl.
*G06F 3/048* (2006.01)
(52) U.S. Cl. ................. 715/837; 715/835; 715/768
(58) Field of Classification Search ........... 715/835, 715/837, 768; 345/630, 639
See application file for complete search history.

(56) References Cited

U.S. PATENT DOCUMENTS

| | | | | |
|---|---|---|---|---|
| 5,491,495 A * | 2/1996 | Ward et al. | ............. | 345/173 |
| 5,572,641 A * | 11/1996 | Kuo | ............. | 345/440 |
| 5,745,121 A * | 4/1998 | Politis | ............. | 345/619 |
| 5,767,852 A * | 6/1998 | Keller et al. | ............. | 715/835 |
| 5,801,699 A * | 9/1998 | Hocker et al. | ............. | 715/837 |
| 5,808,601 A * | 9/1998 | Leah et al. | ............. | 715/856 |
| 5,977,973 A * | 11/1999 | Sobeski et al. | ............. | 715/798 |
| 6,392,659 B1 * | 5/2002 | Ohki et al. | ............. | 345/630 |
| 6,407,757 B1 * | 6/2002 | Ho | ............. | 715/776 |
| 6,411,742 B1 * | 6/2002 | Peterson | ............. | 382/284 |
| 6,857,106 B1 * | 2/2005 | Brouaux | ............. | 715/837 |
| 7,030,890 B1 * | 4/2006 | Jouet et al. | ............. | 345/619 |

* cited by examiner

*Primary Examiner*—Dennis-Doon Chow
*Assistant Examiner*—Brandon Parker
(74) *Attorney, Agent, or Firm*—ÆON Law; Adam L. K. Philipp

(57) ABSTRACT

A Graphical User Interface or "GUI" for use with a computer operating systems that operates dynamically according to the user's preferences. Each element of the GUI is surrounded by a dynamic edge which allows the user to combine two or more elements together to create a visually coherent unit in real time. Users can merge or fuse together two or more edges together thus creating a combined group that has aspects and qualities from the constituent elements. Particular colors and color combinations can be created by the user along with user selected shapes and sizes of individual elements selected from a library of element shapes and sizes. The grouped elements can then be separated back to the individual elements for use in different applications or other groupings as later desired by the user.

7 Claims, 5 Drawing Sheets

DYNAMIC GRAPHIC USER INTERFACE

RELATED APPLICATION DATA

This application claims the benefit of U.S. Provisional Application Ser. No. 60/153,993 filed Sep. 15, 1999, the disclosure of which is incorporated herein by reference.

BACKGROUND OF THE INVENTION

The invention described and claimed herein relates generally to user interfaces for computer systems and more particularly, graphical user interfaces. A graphical user interface or "GUI" facilitates communications between a computer operating system and a computer user. The computer system includes software and hardware, including hardware for a GUI which typically includes both a visual display (commonly a computer monitor) and selector device (commonly a mouse, trackball or keyboard). Through the visual display, the computer system can deliver graphical and textual output to the user.

A conventional GUI is made up of elements presented on the visual display which allow a user to activate an application in a computer operating system. Examples of such elements are the buttons, menus, menu items, scroll bars and the text input fields. Elements give the application the opportunity to display information, such as zones of text or graphical displays. The layout of all the elements of a conventional GUI is generally already setup by the designer of the application, such as in the well-known WINDOWS® operating system made by Microsoft Corporation of Redmond, Wash.

Therefore, limited opportunities are presently available to reconfigure conventional computer applications. These typically include adjusting the position of certain controls like the toolbars. Such interfaces can be regarded as static because they do not allow the possibility of configuration by end-users. Moreover, all these elements are often of a rectangular or square shape, which is neither visually stimulating nor very pleasing to the eye.

SUMMARY OF THE INVENTION

The present invention provides a method and system by which users can completely reorganize a GUI to his or her personal taste. For clarity, the term element as used herein is the object which a user can move on the display device or computer screen using his or her selector device. The element is comprised of a core and an adjacent dynamic zone or edge. The core is the central part of the element. It is this core that is managed by the application program that uses the interface. The edge is the dynamic zone that preferably surrounds the core. The edge manager is the software taking care of the management, the calculation and the display of the dynamic edges.

In a preferred embodiment, each element of the user interface in the present invention is surrounded by a dynamic edge instead of being surrounded by a static edge as in conventional systems. The present invention does not limit the shape of the core of the element to be rectangular, but allows the elements to be of any shape and in one or more pieces. The dynamic aspect of the present invention comes from the possibility of sticking or adhering together several cores in a visually coherent unit and doing it in real time.

For example, in one aspect, a user can manipulate his or her mouse and move an element, say element 1 which is green in color, towards element 2 which is red in color. The edges of element 1 merge with the edges of element 2 in real time and are updated at each movement by the edge manager, provided that the cores of the elements are not overlapping. In one aspect, this merging can be reversed and the user needs only to move one of the two elements way from the other element so that they no longer contact each other and the edges of the respective elements return to their initial size, shape and/or color.

Thus, it is an object of the present invention to provide a dynamic graphic user interface. Other and further objects will appear to those skilled in the art from the specification and drawings.

DETAILED DESCRIPTION OF PREFERRED EMBODIMENTS

In the specific embodiments to be described, the invention provides a dynamic graphic user interface in an application program.

Figure 5A:
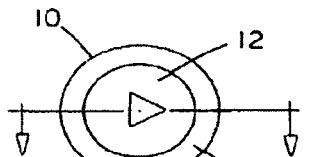
FIG. 5*a* shows one embodiment of an element.
Figure 5B:
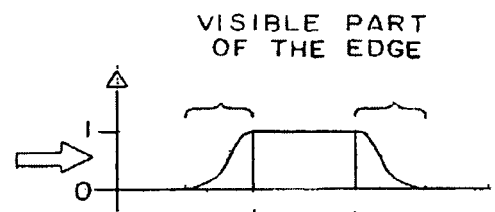
FIG. 5*b* is a graphical illustration of the height values of the element from FIG. 5*a* taken along line 5*b*-5*b*.

Turning now to FIGS. 5*a* and 5*b*, the element 10 is shown with the core 12 and edge or dynamic zone 14 in a preferred embodiment. In FIG. 5*b*, each point of the element 10 can be assigned a numerical value. This is illustrated with a conventional x-y axis in FIG. 5*b*, with the y-axis values representing the numerical value assigned to the point, also called a height value. For all the points which are inside the core 12, the height is preferably equal to a value of one as illustrated in FIG. 5*b*.

For all points which correspond to the edge 14, the height varies from a value of one, if the point is close to the core 12, and tends towards zero value as one moves away from the core 12 as also shown in FIG. 5*b*. Persons skilled in the art will recognize that the two-dimensional representation in FIG. 5*b* applies to other transverse sections through the element 10 and that the core 12 and edge 14 can be represented by a three dimensional array of height values.

Figure 7:
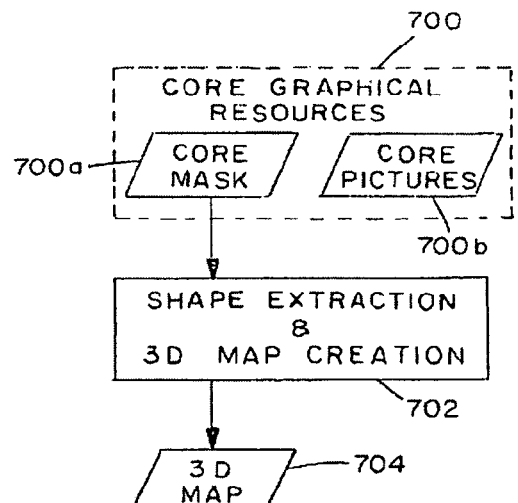
FIG. 7 is a flow diagram summarizing an initialization procedure for one embodiment of the invention.

As shown schematically in FIG. 7, the array of height values is initialized at the creation of an element 10 according to the shape of the core 12. The initialization procedure is a process that associates the core 12 of an element 10 with a edge or dynamic border 14. At step 700, the graphical resources are searched and resources for the core mask 700a and core pictures 700b is searched to find one that matched the shape of the core 12. The edge of dynamic border 14 is computed using a previously defined mask of the core 12 provided for the element 10. From this mask, the shape of the core 12 is extracted and using this shape the array of height values for the edge 14 are calculated as described in connection with FIGS. 5a and 5b and the result is shown at step 704 in FIG. 7. As can be appreciated by skilled persons, once this array is calculated it can then be modified to render different textures and colors for each element 10.

Figure 6:
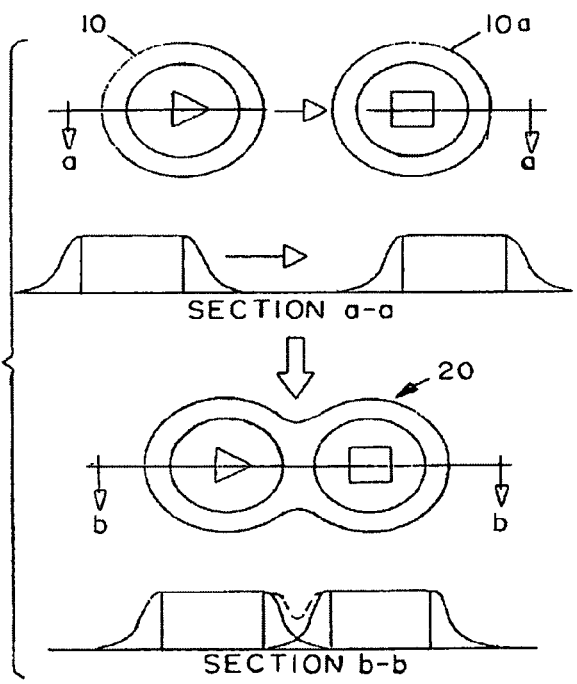
FIG. 6 shows an embodiment showing the fusion of edges of dynamic zones of two elements.

In a preferred embodiment shown in FIG. 6, a user can fuse together two or more edges 14 and 14a of two or more elements 10 and 10a. A preferred operation of the edge manager of the specific embodiment for fusing two or more edges 14 and 14a is described in connection with FIG. 8. At the start of FIG. 8, the user moves first element (designated A) in step 800. Block 800A is the process of retrieving the list of elements that are touching element A. In detail, step 802 reviews the global list of elements and a determination is made at step 804 as to whether the next element is touching element A. If the answer is yes, then step 806 adds that element to the touching list and then transfers the operation to step 808. If the answer is no, the operation is transferred to step 808 which asks if the current element is the last one in the global list. If the answer is no, then the operation is transferred back to step 802 to retrieve the next element in the global list, repeating the above steps for the next element. If the answer is yes, then the operation is transferred to Block 800B which is the merging block.

In detail, Block 800B retrieves the next element from the previously assembled touching list at step 810 and then, at step 812, asks if that element includes a dynamic border.

If the answer is yes, then the border of that element is merged with the border of element A in step 814 and operation is transferred to step 816. If the answer at step 812 is no, the operation is transferred to step 816 which asks if the current element is the last one in the touching list. If the answer is no, operation is transferred back to step 810 to get the next element in the touching list. If the answer is yes, operation is transferred to step 820.

Figure 8:
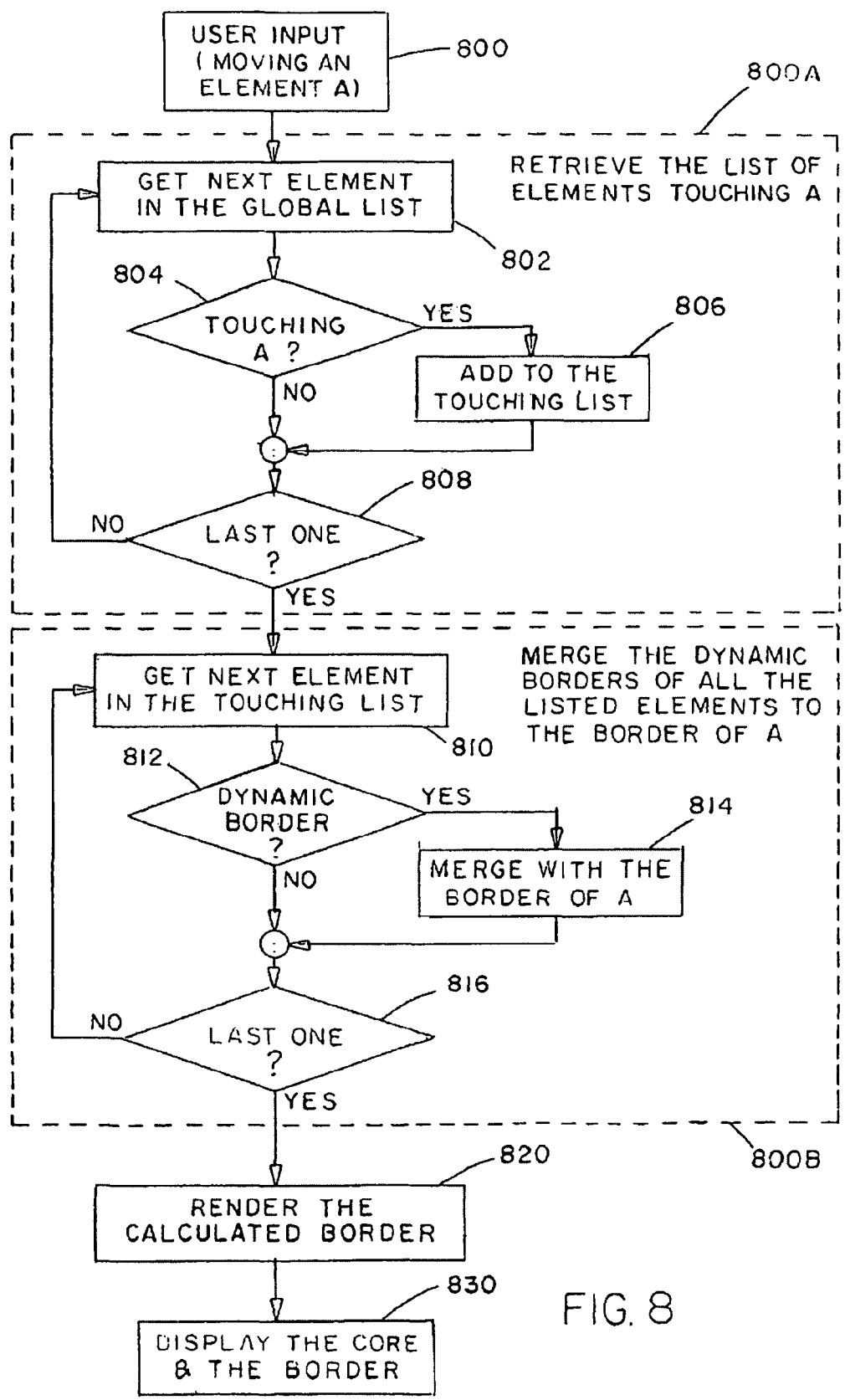
FIG. 8 is a flow diagram illustrating a calculation process for the merging of the dynamic zones or edges of one or more elements in an embodiment.

At step 820, the merged dynamic borders are rendered and then at step 830 the core and dynamic border is displayed. When the user moves an element 10 toward another element 10a, a determination is made if the borders of elements 10 and 10a are going to overlap and this process is done for all additional elements that overlap or touch element 10 as shown in FIG. 8. When two elements merge, the merged portion is calculated using the addition of two height arrays as shown graphically in FIG. 6.

When an edge 14 merges with more than one other edge, the arrays corresponding to the touching edges 14 and 14a are added to obtain the global array for the merged portion which will be the merged dynamic border. The merged edge array is equal to the sum of all the edge arrays of the elements in the merged group.

The melted color aspect of the edges is achieved by using the height values of each edge array to mix the colors of each element doing a weighted average. For two colors, say C1 and C2, and using the height of each edge, say a1 and a2, the melted or final color, Cf, of the global edge is preferably calculated using the equation:

$$Cf=(C1*a1+C2*a2)/(a1+a2)$$

Creation of Groups

Figure 1:
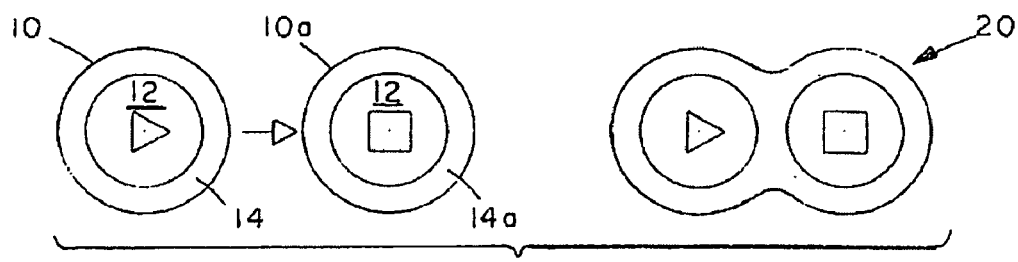
FIG. 1 is an illustration of two elements of the inventive graphical user interface and the two elements combined or fused together.
Figure 2:
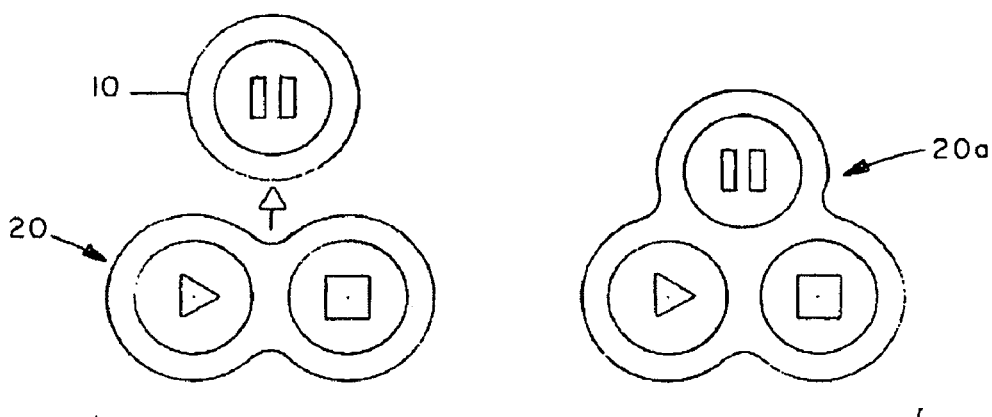
FIG. 2 illustrates a group of elements in one embodiment of the present invention.

If the edges 14 and 14a of two or more elements 10 and 10a are merged, it is possible to freeze or "stick together" all the elements as shown in FIG. 2. This arrangement will behave in the same way that a single element 10 behaves and is called a group 30. This group 30 comprises as many cores 12 as there were in all the elements comprising the group 30 and the position of one of the cores 12 is fixed relative to the other cores in the group 30 as shown in FIG. 2. This group 30 could be merged again with another element 10b. A group 30 behaves like a single element 10, so it is possible to create a new group 30a from a set of elements composed of groups. As shown in FIG. 2, a group 30a of three cores 12 is created and can be made of a single element which is yellow and another group 30 made up of a green element 10 and a red element 10a.

Figure 3:
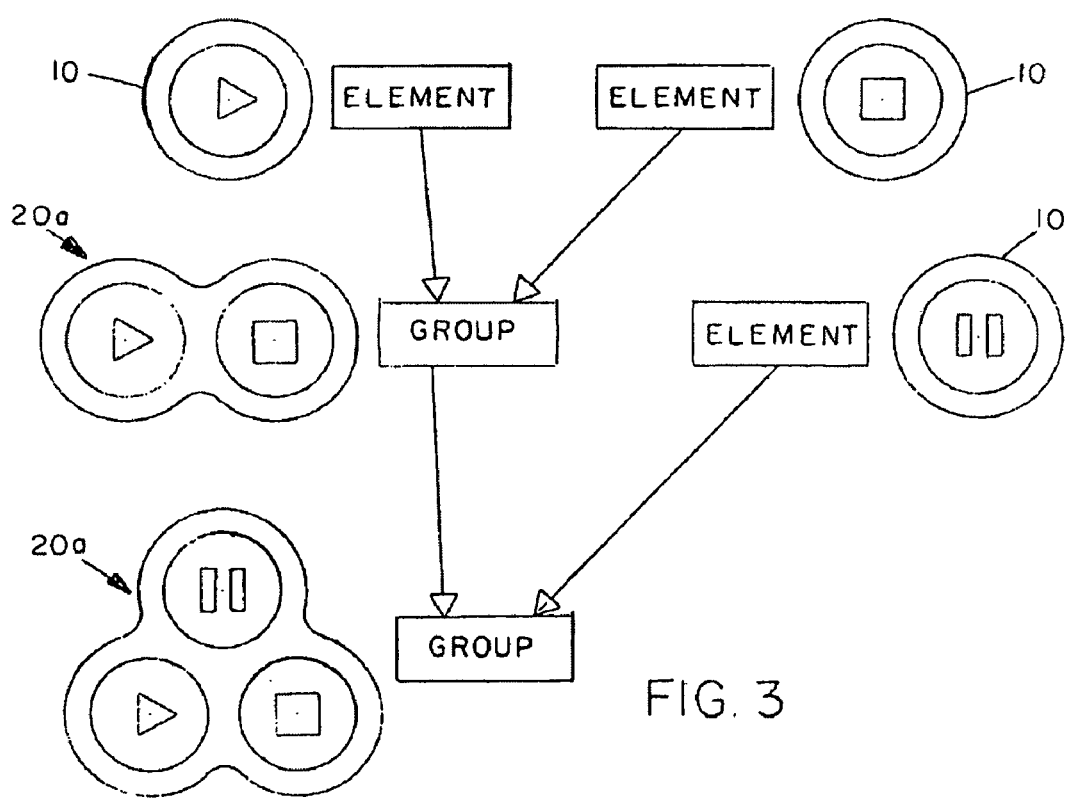
FIG. 3 illustrates the group of elements in a tree arrangement illustration of an embodiment of the present invention.
Figure 9:
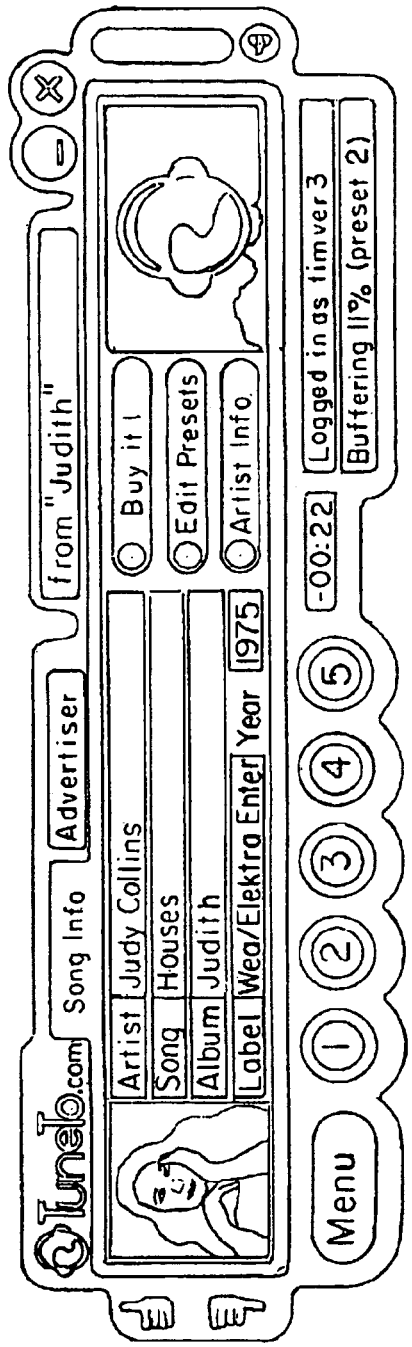
FIG. 9 is an illustration showing one use of the present invention with elements of different shapes.
Figure 10:
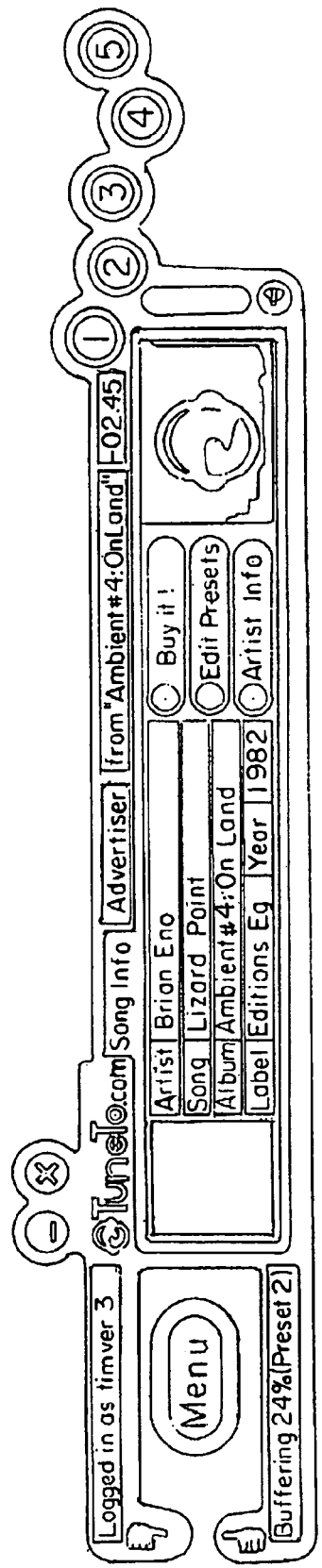
FIG. 10 is an illustration showing another use of the present invention with the elements arranged to form a design in the shape of an alligator.
Figure 11:
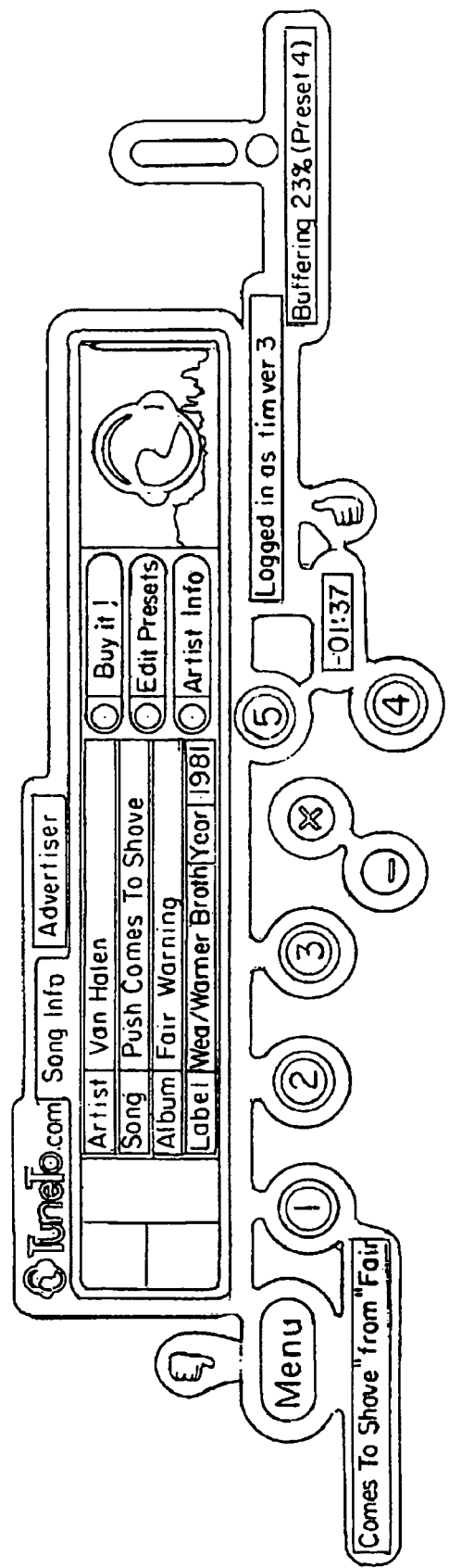
FIG. 11 is a further illustration showing the elements of the present invention arranged to form a design in the shape of a locomotive.

This grouping process can be repeated as long as elements remain to be "stuck" together. This grouping procedure can be represented as a tree structure as shown in FIG. 3, whose "leaves" would be simple elements (10, 10a, 10b . . . .) and whose nodes would be the grouped elements. Once the group 30a is created, the elements of the group 30a can be removed from the group 30a. For example, as graphically illustrated in FIG. 3, the elements can be removed by going along the tree from the group 30a and sequentially removing the elements from the group 30a so that only single elements remain. The user configured groups can include many different designs as illustrated in FIGS. 9, 10 and 11.

Static/Dynamic Aspect of the Edge

Figure 4:
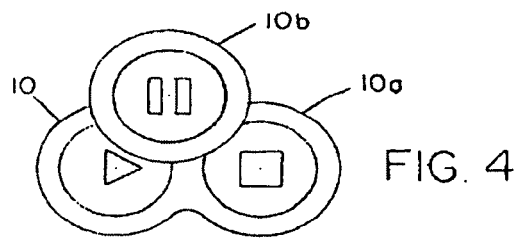
FIG. 4 shows an embodiment with a static element.

In another preferred embodiment, an edge 14 can be static meaning it cannot be merged with other edges 14a. In this embodiment, the static edge 14 behaves like a standard window and passes on top of the other elements as shown in FIG. 4. In one embodiment, the static edge 14 can be altered to be a dynamic edge. For example, if an element 10 with a static edge 14 is on top of another element 10a with a dynamic edge as shown in FIG. 4, the static edge 14 can be turned into a dynamic edge if the core 12 of elements 10 does not overlap with any of the cores of element 10a. For the example shown in FIG. 4, the static edge 14 cannot be turned into a dynamic edge since its core 12 overlaps the cores of the overlapped or subjacent elements.

While embodiments of the present invention and modifications thereto have been shown and disclosed in the drawings and specification, alternate embodiments of the present invention will be apparent to a person of ordinary skill in the art and this application is intended to include those embodiments within the full breadth and scope of the claims. The present invention is not limited by any parameters described herein and the present invention need not include all of the features disclosed in the single embodiment, but rather one or more features may be included.

What is claimed is:

1. A method comprising: for each of a plurality of dynamic elements in a graphical user interface of an application program in a computer system: associating the current dynamic element with at least one command;

obtaining a core picture and a previously-defined core mask associated with the current movable dynamic element; and computing a dynamic edge of a dynamic edge region according to said previously-defined core mask, said dynamic edge region comprising an array of height values, wherein said height values tend towards zero away from said previously-defined core mask;

determining in a computer system that at least a first dynamic element and a second dynamic element are in close proximity;

fusing in a said computer system at least said first dynamic element and said second dynamic element into a fused group as follows:

rendering a first core picture corresponding to said first dynamic element proximate to a second core picture corresponding to said second dynamic element; adding a first array of height values corresponding to said first dynamic element and a second array of height values corresponding to said second dynamic element;

determining a combined continuous dynamic edge by determining which zero height array values of said added first array of height values corresponding to said first dynamic element and a second array of height values are adjacent to non-zero height array values;

rendering a single continuous dynamic edge region adjacent to and surrounding said first and second core pictures, said single continuous dynamic edge region being bounded by said combined continuous dynamic edge; and rendering said combined continuous dynamic edge.

2. The method of claim 1, further comprising:

determining that a third core picture corresponding to a third dynamic control element overlaps at least one of said first core picture and said second core picture.

3. The method of claim 2, further comprising:

rendering said third core picture superimposed over said at least one of said first core picture and said second core picture; and rendering a third dynamic edge corresponding to said third dynamic control element as a static edge surrounding said third core picture and superimposed over a portion of said combined continuous dynamic edge.

4. The method of claim 1, further comprising determining whether the first core picture overlaps said second core picture 5. The method of claim 4, wherein said fusing step occurs only if said core pictures do not overlap.

6. The method of claim 1, wherein:

each of said dynamic elements comprises a color, and said fusing at least two of said dynamic elements further comprises calculating a melded color in accordance with said combined height values.

7. The method of claim 6, wherein said melded color ranges between the color of one of said two or more dynamic elements and the color of another of said two or more dynamic elements.

* * * * *

UNITED STATES PATENT AND TRADEMARK OFFICE
CERTIFICATE OF CORRECTION

| | | |
|---|---|---|
| PATENT NO. | : 7,818,687 B2 | Page 1 of 1 |
| APPLICATION NO. | : 11/039070 | |
| DATED | : October 19, 2010 | |
| INVENTOR(S) | : Alexandre Marc Jacques Brouaux | |

It is certified that error appears in the above-identified patent and that said Letters Patent is hereby corrected as shown below:

Title page item (60), in Column 1, line 1, Below "Prior Publication Data"
Insert:

-- Related U.S. application Data
(60) This application is a continuation of U.S. Patent Application No. 09/663,296, filed September 15, 2000, titled "GRAPHICAL USER INTERFACE WITH MOVEABLE, MERGEABLE ELEMENTS", and naming inventor Alexander Marc Jacques BROUAUX. --

Signed and Sealed this
Twenty-third Day of June, 2015

Michelle K. Lee
*Director of the United States Patent and Trademark Office*